Feb. 19, 1935. H. A. EKLIND 1,991,500
MACHINE TOOL AND ATTACHMENTS THEREFOR
Filed April 6, 1932 5 Sheets-Sheet 1
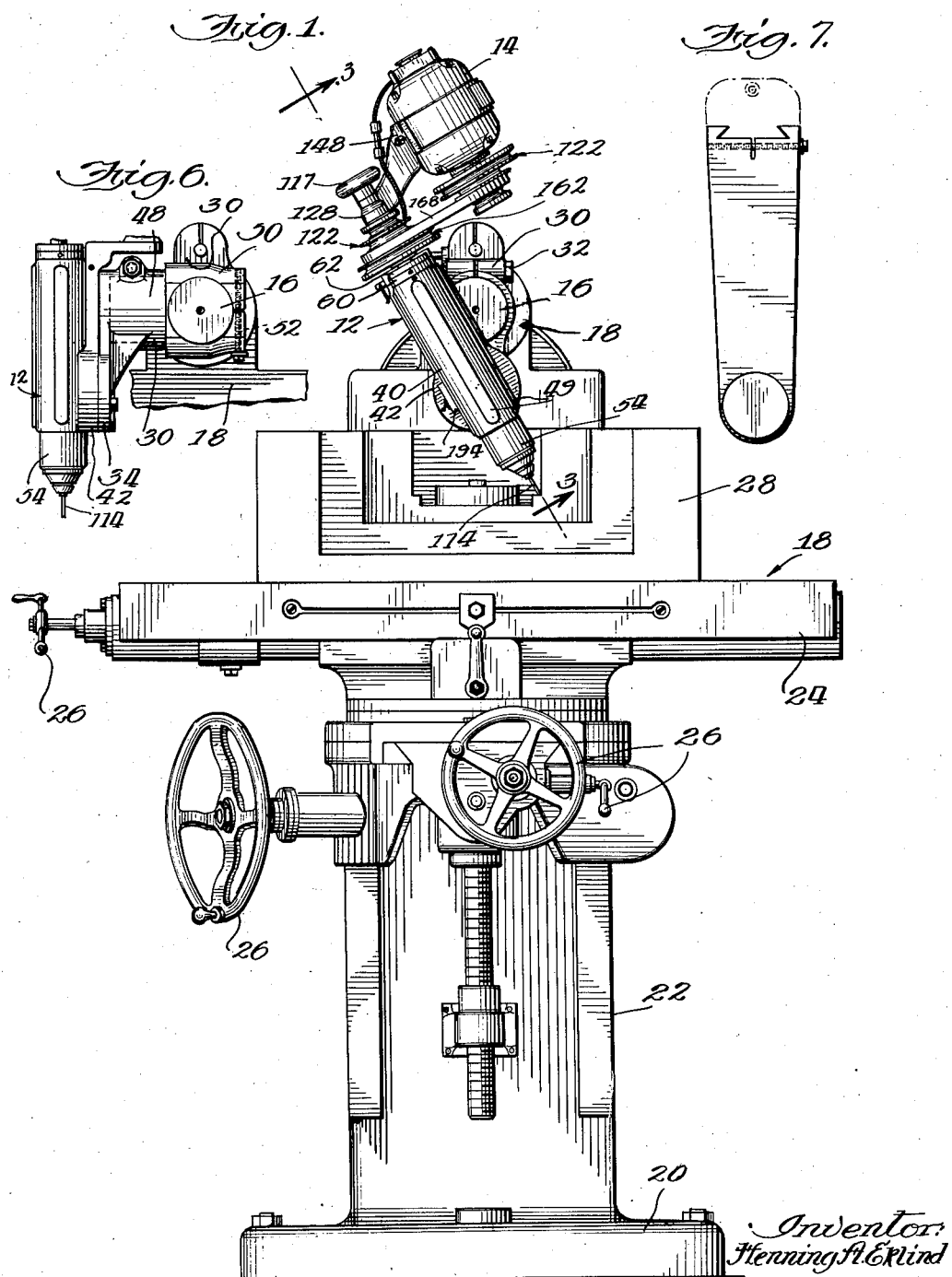

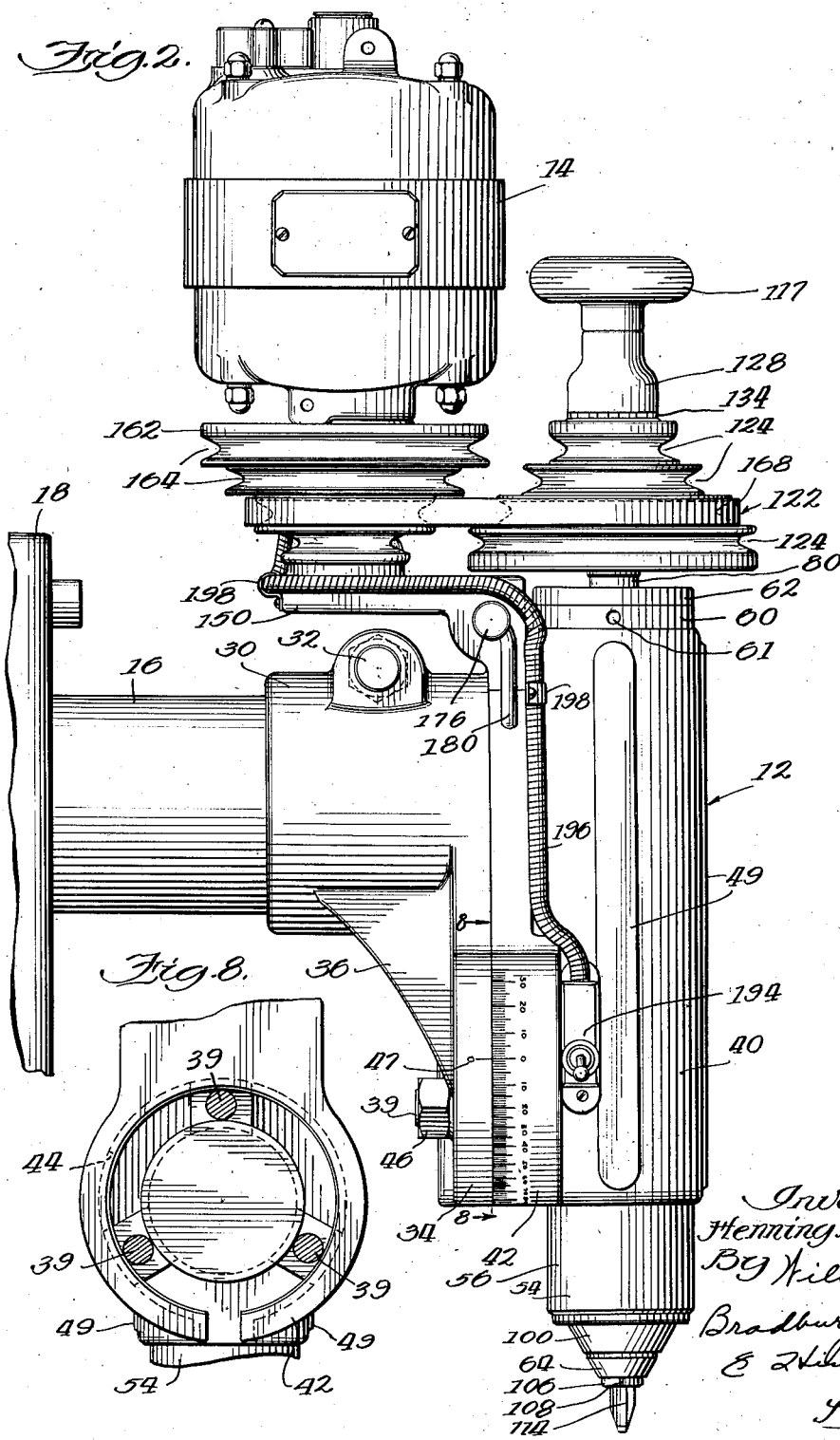

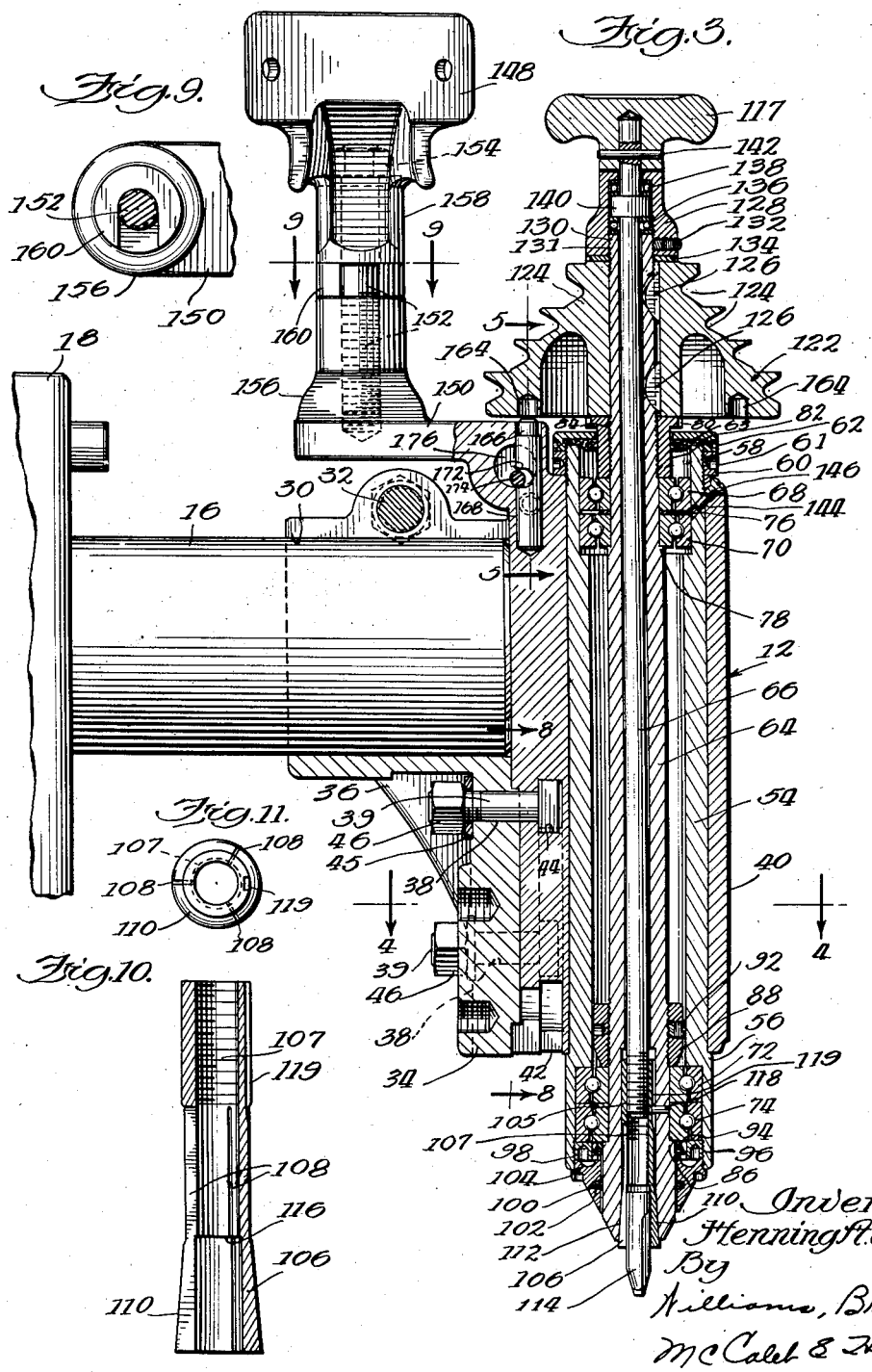

Feb. 19, 1935.   H. A. EKLIND   1,991,500
MACHINE TOOL AND ATTACHMENTS THEREFOR
Filed April 6, 1932   5 Sheets-Sheet 4
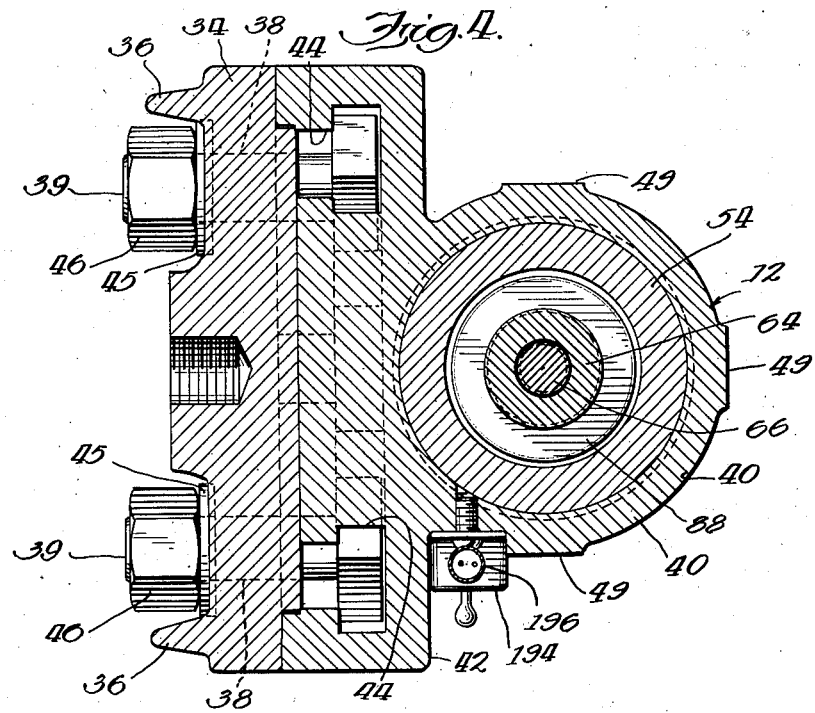
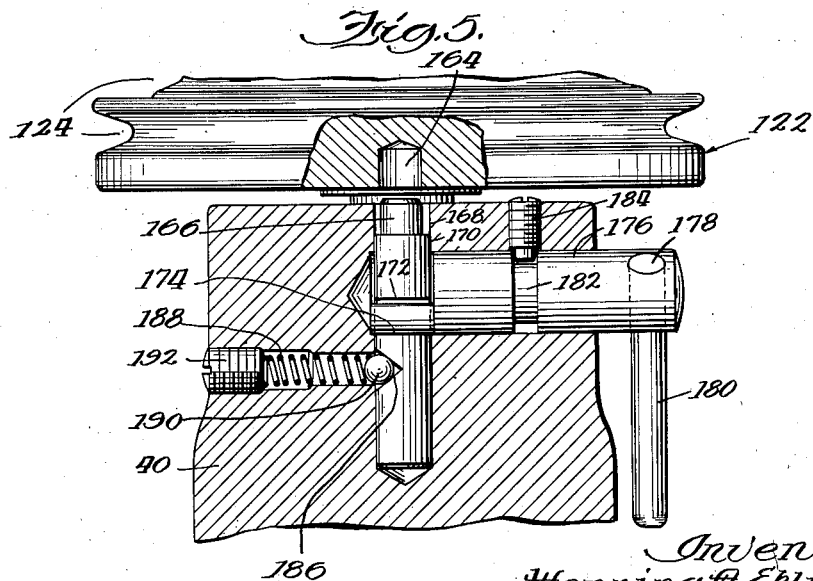
Inventor:
Henning A. Eklind
By Williams, Bradbury,
McCaleb & Hinkle
Attys.

Feb. 19, 1935.    H. A. EKLIND    1,991,500
MACHINE TOOL AND ATTACHMENTS THEREFOR
Filed April 6, 1932    5 Sheets-Sheet 5
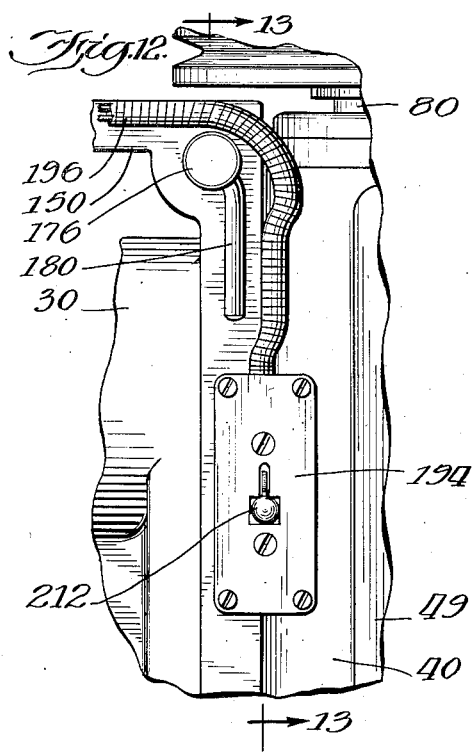
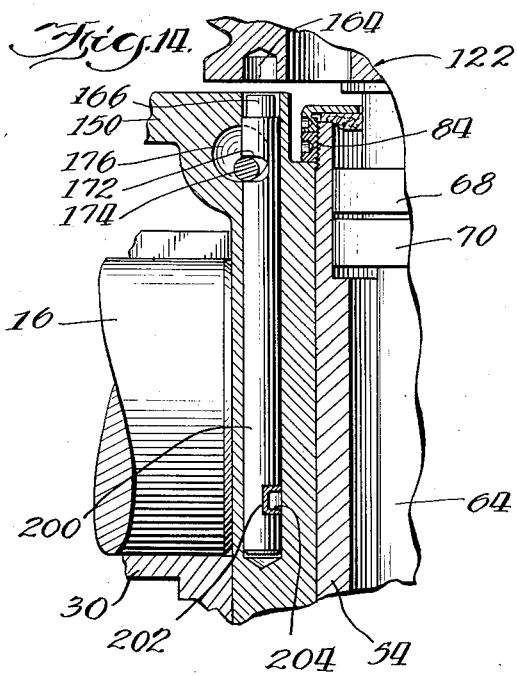
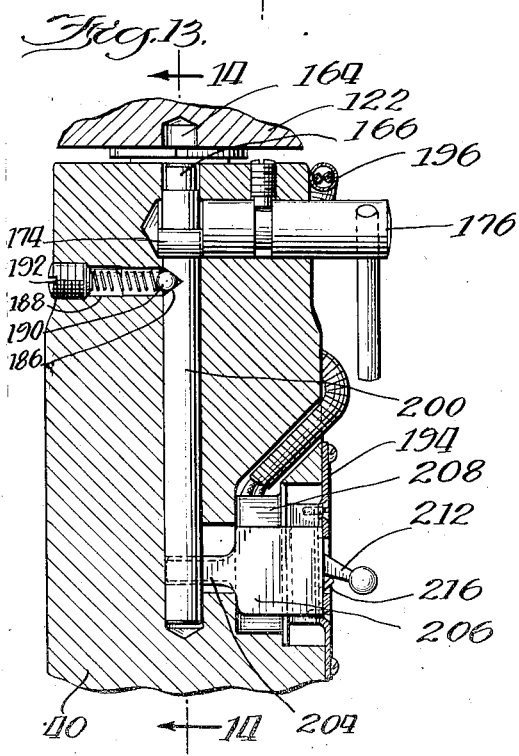
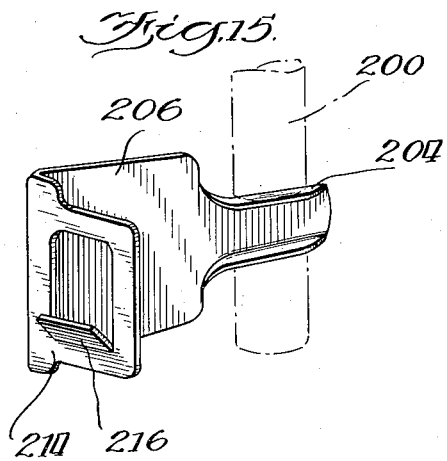
Inventor:
Henning A. Eklind
By Williams, Bradbury,
McCaleb & Hinkle
Attys.

Patented Feb. 19, 1935

1,991,500

UNITED STATES PATENT OFFICE 1,991,500

MACHINE TOOL AND ATTACHMENTS THEREFOR

Henning A. Eklind, Chicago, Ill.

Application April 6, 1932, Serial No. 603,511

8 Claims. (Cl. 90—17)

My invention relates to machine tools and more particularly, to attachments therefor.

An object of my invention is the provision of an attachment for a machine tool which carries its own motor and is adapted to perform fine, close work, which the machine tool on which it is mounted is not designed to perform.

A further object of my invention is the provision of an auxiliary machine tool for mounting on a milling machine, lathe, or the like, which carries its own motor and is adapted to be mounted on the milling machine and used in conjunction with the work table of the latter.

A further object of my invention is the provision of a machine tool arranged for mounting on a milling machine or the like which carries its own motor, is adapted for driving a tool at a plurality of speeds, and is arranged to be swung at any angle to the work so as to perform fine accurate operations on dies, fixtures and the like.

A further object of my invention is the provision of an auxiliary machine tool, for mounting on machine tools such as milling machines, lathes, and the like, which is supported from the machine on which it is mounted in such manner that the point of support is close to the work, whereby the auxiliary tool will be more rigid and be capable of performing more accurate work.

A further object of my invention is the provision of an auxiliary tool which may be driven at any one of a plurality of speeds by means of belt and cone pulleys, and the provision of means for locking one of the pulleys, whereby the tool may be more easily removed, and the provision of means for changing the position of one of the cone pulleys whereby additional cutting tool speeds may be obtained.

A further object of my invention is the provision of an auxiliary tool for mounting on a machine tool, which is provided with an improved and simple means of holding a cutting tool.

A further object is to provide a machine tool in which the cutting tool may easily be set in a large variety of different positions at any desired angle.

A further object is to provide an improved means for preventing operation of the motor switch when the mechanism is not in condition for operation.

Other objects and advantages will be more apparent from an understanding of the specifications taken in connection with the drawings, in which Figure 1 is a view of a machine tool having my auxiliary tool mounted thereon;

Figure 2 is an enlarged view of my improved auxiliary tool;

Figure 3 is a view taken substantially on line 3—3 of Figure 1;

Figure 4 is a view taken substantially on the line 4—4 of Figure 3;

Figure 5 is a view showing my method of locking a cone pulley;

Figure 6 is a view showing an alternate means of mounting my auxiliary tool on a machine tool;

Figure 7 is a view showing an alternate means of mounting my auxiliary tool on a machine tool having a different type of support arm;

Figure 8 is a view taken substantially on the line 8—8 of Figure 2;

Figure 9 is a view taken substantially on the line 9—9 of Figure 3;

Figure 10 is a view showing my improved cutting tool holding means;

Figure 11 is a plan view of the tool holder shown in Figure 10;

Figure 12 is a fragmentary elevation of a portion of the machine illustrating a modified motor control switch;

Figure 13 is a fragmentary sectional view taken on the line 13—13 of Figure 12;

Figure 14 is a vertical sectional view taken on the line 14—14 of Figure 13; and Figure 15 is a perspective view of the switch lock.

Briefly, my invention contemplates the provision of a self-contained auxiliary tool 12, arranged to be driven by its own motor 14 supported from and secured to the auxiliary tool 12. The auxiliary tool may be mounted and supported from any type of machine tool in any suitable manner and, as shown in the drawings, is supported from an arm 16 projecting from a machine tool 18. The machine tool on which the auxiliary tool 12 is mounted may be any type of machine such as is ordinarily used in a machine shop, as, for example, a lathe, boring mill, milling machine, etc. The machine tool shown in the drawings is a milling machine and comprises a base 20, a supporting column 22, a work table 24, and the usual means designated generally by the number 26 for controlling the operations of the milling machine. The milling machine shown in the drawings is of the horizontal type in which the table 24 may be driven in either a horizontal or a vertical plane while the position of the cutting tool remains stationary, so that the work is fed into the cutting tool.

In using a milling machine of this type, especially in the making of dies, fixtures, or performing any type of work in which accurate cutting into corners, accurate drilling or reaming are required, the milling machine proper may be used for the plain milling operations, and the more unusual operations then performed by the auxiliary tool without removing the work, die, or fixture being made, from the machine. The attachment thus makes it unnecessary to remount the work in a machine capable of performing the unusual operations which could not otherwise be performed.

I provide an auxiliary tool for performing these drilling, reaming, or accurate cutting operations which may be mounted on the machine tool, used to perform operations for which the machine tool is not adapted and which, after the fine operations are completed, may be rotated out of cutting position or entirely removed from the machine tool so as not to interfere with operations of the latter.

In Figure 1 my auxiliary tool is shown performing an operation on a piece of work 28, which is mounted in the usual ways provided in the table 24. The auxiliary tool 12 is mounted on the arm 16, by means of a split collar 30 which fits over the arm 16. The split portions of the collar 30 are drawn together by means of a nut and bolt assembly 32, so that the auxiliary tool 30 may be secured to the arm 16 with a high degree of rigidity.

The collar 30 has a depending flange portion 34 which is reinforced by depending ribs 36. The depending flange 34 of the collar 30 is circular in shape, and has a plurality of apertures 38, each adapted to receive a bolt 39. The tool 12 has a housing or casing 40 and there may be cast integral with the casing 40 a flange 42, partially circular in shape and the circular portion of which is of the same diameter as the depending flange 34. The faces of the two circular flanges 34 and 42 are finished so as to form complementary bearing surfaces and the heads of the bolts 39 project into a circular T shaped slot 44 provided in the flange 42. The two flanges are secured by nuts 46 on bolts 39 and if desired there may be provided washers 45. Upon loosening the nuts 46, the auxiliary tool may be rotated about the depending flange 34.

The depending flange 34 may be provided with a zero mark 47 and the circular flange 42 may be graduated around its circumference so that when the auxiliary tool 12 is in a vertical position the zero mark on the graduated portion will be in registry with the mark 47 on the flange 34. The markings on the circular portion 42 are preferably in degrees so that the displacement of the auxiliary tool from the vertical may be conveniently read in degrees. After the tool has been set at the desired angle it is rigidly secured in this position by means of the nuts 46. The outer surface of the casing 40 has a plurality of planed, true surfaces 49 so that the zero mark on the angle indicating dial may be checked occasionally to see that the auxiliary tool is actually in a vertical position with respect to the table when the two zero marks are in registry.

The type of mounting described adapts the tool for rotation through 360° in one plane. If desired the means for mounting the auxiliary tool may be modified so that the tool may be rotated in all directions as shown in Figure 6, wherein the collar 30 instead of being mounted directly on the arm 16, is mounted on the arm 16 through an auxiliary arm 48. The auxiliary arm 48 may be formed integrally with a clamping means 50 which is adapted to be secured to the arm 16 by means of a bolt 52. By this method of mounting, the auxiliary tool may be rotated in two planes namely around the arm 16 and around the depending flange 34.

Internally of and concentric with the casing 40, there is mounted a cylindrical tube 54 which may be formed of any hard tough seamless steel tubing stock. The tube 54 is provided with an enlarged portion at 56 and in assembling the tube 54 is pushed up in the casing 40 until the enlarged portion 56 abuts against the end of the casing 40. The upper portion of the tube 54 is threaded at 58, and a retainer ring 60 is threaded on the tube 54 until it abuts against the upper portion of the casing 40. The retainer ring 60 may be provided with spanner wrench holes at 61 or with any other convenient means of drawing the retainer ring down tightly against the end of the casing. A cap 62 having a large central aperture is threaded on the projecting portion of the tube 54 and between the cap and the end of the tube there is inserted packing 63.

Concentric with the tube 54, there is mounted a spindle or rotatable element 64, internally of which there is provided a pull rod 66 rotatable with the spindle 64. The upper portion of the spindle 64 is rigidly spaced from the tube 54 by means of bearings 68 and 70, and the lower portion of the spindle 64 is spaced from the tube 54 by means of bearings 72 and 74. The upper bearings 68 and 70 may be spaced from each other by means of a washer 76 and the inner races of the bearings are fixed to the spindle 46 and rotate therewith.

The diameter of the spindle 64 is decreased at the lower bearing forming an abutment 78 on which the inner race of the bearing 70 rests. The upper portion of the inner race of the bearing 68 is held in position by means of a collar 80, having a depending portion 82. The spindle 64 is threaded at 84 and the collar 80 fits in the central aperture formed in the cap 62 and is drawn down so that the inner races of the bearings 68 and 70 are confined between the abutment 78 and the end of the collar 82. The outer races of the bearings 68 and 70 are unconfined so that a certain amount of vertical play is allowed. The inner race of the lower bearing 74 abuts against an enlarged portion 86 of the spindle 64, and the inner race of the upper bearing 72 is confined so that there is no vertical play in the bearings by means of a collar 88 which is threaded on the spindle 64. If desired, the collar 88 may be provided with a lead disc and set screw 92, so that the collar will be held securely in position. The internal diameter of the tube 54 is increased at the bearing 72 to provide an abutment for the outer races of the bearings while the lower end of the tube 54 is threaded at 96 and a retainer ring 98 is drawn up flush with the lower bearing 74 so that the outer races are also restrained from vertical movement. Below the bearing 74 and around the spindle 64 and rotatable therewith, there is secured an oil ring 94.

There is also secured by means of the threads 96, a collar 100, provided with a packing groove 102. In the upper portion of the spindle collar 100, there is provided a shallow depression 104, so that oil flowing downwardly through the bearings 72 and 74, and thrown outwardly by the oil ring 94, will drop into the shallow depression 104. This provision together with the packing ring 102 prevents oil from dripping from the end of the spindle.

Concentric with the spindle 64 and internally thereof, there is a cutting tool holder piece or collet 106 held in place by means of threads 105 on the lower end of the pull rod 66 which cooperate with corresponding threads 107 formed internally of the collet. The lower portion of the collet 106 is slotted to form a plurality of fingers 108, preferably three in number while the lower and outer circumference of the collet 106 is tapered at 110 to cooperate with a corresponding taper 112, provided internally of the spindle 64. The angle of the taper is very small, approximately 5° (included angle, 10°). In this manner when the collet 106 is drawn upwardly, by rotating the pull rod 66 independently of the spindle 64, the fingers 108 are drawn inwardly and a cutting tool 114, which is inserted in the mouth of the collet 106, is held securely by the split portions or fingers of the collet. Since the taper on the collet is extremely small the tool will be very tightly held. The internal bore of the collet is decreased at 116 to provide a ledge against which the end of the tool 114 abuts when the cutting tool, which may be of any type such as a drill, reamer, router, milling cutters, etc., is pushed into the mouth of the collet. The upper end of the pull rod 66 is secured to a handle or knob 117 and a pin 118 projects through an aperture formed in the wall of the spindle 64 and projects into a longitudinal slot 119 formed in the collet 106 so that the handle and the pull rod 66 may be rotated independently of the spindle 64.

A cone or step pulley 122 having a plurality of belt grooves or independent belt pulleys 124 is secured to the spindle 64 in a position flush with the collar 80 by means of keys 126 which fit into key slots formed in the spindle and in the bore of the cone pulley. A thrust bearing housing 128 is secured to the upper portion of the spindle 64 by means of threads 130 formed in an internal bore of the thrust piece 128 and cooperating threads 131 formed on the spindle. The thrust piece may be held securely in position by means of a lead disc and set screw 132 which projects through an aperture formed in the thrust piece and contacts with the spindle.

Between the thrust piece 128 and the pulley 122 there is provided a washer 134 which allows some slight movement between the pulley 122 and the thrust piece 128. The spindle 64 projects a short distance into the thrust piece 128 and above the termination of the spindle 64 there are mounted thrust bearings 136 and 138. Between the thrust bearings 136 and 138, and integral with the pull rod 66, there is provided a collar 140 so that the upward thrust on the pull rod 66 is transmitted to the bearings and thence to the thrust piece 128. The pull rod 66 projects into an aperture formed in the handle 117 and is secured in the handle by means of a key 142. Oil is fed to all the bearings through an aperture 144 provided in the casing 40 and in the tube 54, dirt being prevented from entering aperture 144 by means of a closure screw 146.

The motor 14 is secured to the casing 40 by a motor bracket 148, curved so as to conform to the curvature of the outer casing of the motor 14. An arm 150 integral with the casing 40 projects sidewardly from the casing 40 and has an upstanding portion 156 which with a depending portion 158 on the bracket 148 and the depending portion 158 there is inserted a removable collar 160 while the motor support arm assembly is bolted together by means of a bolt 152 and a nut 154.

On the shaft of the motor 14 there is mounted a cone or step pulley 162 having grooves or independent belt pulleys 164 and the motor support arm is of such length that the cone pulley 162 is supported in position so that the pulley 164 having the greatest diameter is in registry with the pulley 124 having the smallest diameter. In this manner a plurality of speeds may be obtained at the spindle with one constant motor speed by changing a belt 168 from one set of grooves to another.

It will be observed that both pulleys are provided with four grooves so that four spindle speeds may be obtained. In order to provide additional speeds without increasing the number of independent pulleys on the cone pulleys, means are provided for moving the motor 14 and the cone pulley 162 downwardly. The nut 154 is unloosened and the motor and motor bracket 148 removed so that the collar 160 may be taken out. The cone pulley 162 may then be moved downwardly in relationship to the cone pulley 122 until the largest pulley 164 is in registry with the next to the smallest pulley 124. In this manner three additional spindle speeds are provided so that, in all, seven cutting tool operating speeds are obtained.

When it is desired to remove a cutting tool from the collet 106, the cone pulley 122 and all parts associated therewith may be held against rotation by suitable means to be described. Thus, the operation of removing and replacing the cutting tool may be very easily performed.

The lower face of the cone pulley 122 has a plurality of apertures 164 into which there may be projected a locking piece 166 mounted in a bore 168 provided in the casing 40. The locking piece may be enlarged at 170 and provided with a semi-circular slot 172 into which may be projected a key 174 mounted eccentrically on a rotatable shaft 176. When the shaft 176 is rotated, the key 174 is moved into the slot 172 and, as the shaft 176 is rotated further, the locking piece 166 is projected upwardly and into one of the apertures 164, the pulley 122 being rotated slightly so as to bring one of the apertures 164 in registry with the locking piece 166. The outer portion of the rotatable shaft 176 is provided with an aperture 178 in which there is mounted a handle 180 to facilitate the rotation of the shaft 176. The shaft 176 is provided with a groove 182 into which the end of a set screw 184 projects so as to prevent the shaft from slipping out of the casing 40.

In order to prevent the locking piece 166 from being accidentally projected into one of the apertures 64, means are provided for restraining the locking piece 166 from moving upwardly. The locking piece 166 is provided with a V-slot 186 into which a ball 190 is held by means of a spring 188. A set screw 192 serves as a means of adjusting the tension of the spring 188 and also serves as a backing for the spring. In this manner, a positive push on the handle 180 is required in order to project the locking piece 166 upwardly against the tension of the spring 188 and the locking piece 166 is unlikely to be accidentally projected into one of the apertures 164 when the motor 14 is rotating.

The motor 14 is controlled by a switch 194 which is mounted conveniently on the spindle casing 40. The switch is connected to the motor by a lead 196 which is held close to the casing by suitable brackets 198.

It will be observed that the casing 40 is supported from the arm 16 at a point close to the work, and that the steel tubing 54 extends downwardly over the portion in which the lower bearings are mounted in such manner that the cutting tool 114 is supported rigidly, may be rotated at high speed, and is adapted to perform fine, accurate cutting or drilling operations or operations of a similar nature.

In Figures 12 to 15, I have illustrated a modified form of my invention in which means are provided to prevent operation of the motor switch when the locking piece 166 is positioned in one of the apertures 164 of the cone pulley 122. Inasmuch as most of the parts disclosed in Figures 12 to 15 have been previously described, similar reference characters have been applied to similar parts. The locking piece 166 is formed integral with a relatively long rod 200 which is, of course, longitudinally slidable in the casing 40, being operated by rotation of the shaft 176, as previously described. The rod 200 has a transverse slot 202 formed near its lower end to receive the channel-shaped extension 204 of an interlocking member 206, which is preferably formed of a sheet metal stamping. The motor switch 208 is mounted within a suitable recess formed in the casing 40 by means of a plate 210, the switch being of the usual type having a pivotally mounted finger piece 212. When this finger piece is in its lowermost position, as shown in Figure 13, it is in its "on" position. The interlocking member 206 has an apertured sidewardly extending flange 214, which lies in front of the switch 208 and through the aperture of which the finger piece 212 projects. The flange 214 has a projecting lug 216 which lies beneath the finger piece 212 and is adapted to engage the latter. When the locking piece 166 is in its uppermost position within the socket 164 of the cone pulley 122, the projecting lug 216 will be raised from the position in which it was shown in Figure 13 sufficiently so that it will be impossible to swing the finger piece downwardly to switch on the motor. This interlocking mechanism thus prevents the possibility of burning out the motor due to an inadvertent attempt to start the motor when the cone pulley is held against rotation by means of the locking piece. Similarly, this interlocking mechanism will prevent the operator from inadvertently raising the locking piece 166, for if he applies sufficient force to raise the locking piece the motor will automatically be switched off, since the projecting lug 216 will engage the finger piece 212 and swing the latter to its "off" position.

Having thus described my invention, what I claim as new and desire to secure by Letters Patent is:

1. In combination a machine tool and an auxiliary tool adapted to be mounted on said machine tool comprising a casing, a rotatable element in said casing, a motor for driving said rotatable element, a pair of cone pulleys, one secured to said rotatable element and one secured to the shaft of said motor, and adjustable means for supporting said motor upon said casing in one of two positions of adjustment, whereby the cone pulley attached to said motor may be translated relative to the other of said cone pulleys.

2. In a machine tool having an auxiliary tool mounted thereon, independent driving means for said auxiliary tool, a pair of cone pulleys for transmission of power from said independent driving means to said auxiliary tool, and means for restraining one of said pulleys from rotating, comprising a locking bolt having a slot therein, a shaft, and an eccentric projection on said shaft engageable in said slot upon rotation of said shaft.

3. In combination with a machine tool, an auxiliary tool arranged to be mounted on said machine tool, a separate driving element for said auxiliary tool, means to control the operation of said driving element, means for locking a normally moving part of said auxiliary tool against movement, and interlocking means operable to prevent operation of said control means when said locking means is in operative position.

4. In a machine of the class described, the combination of a collet, an electric motor for rotating said collet, a power transmission between said motor and said collet, a switch for controlling said motor, a lock to hold said transmission means stationary, and an interlock between said lock and said switch.

5. In a machine tool having a projecting arm, an auxiliary tool therefor, said auxiliary tool comprising a casing, a motor and spindle secured to said casing, a mounting bracket secured to said casing for adjustable rotation relative thereto, said mounting bracket being provided with a clamp socket, and a mounting element having means for securing it to said arm in any one of a plurality of angular positions, said element having a cylindrical projection normal to the axis of said arm when the element is clamped thereto, said projection fitting into said clamp socket and forming the support therefor.

6. In a machine tool, a driving pulley and a driven pulley, said driven pulley being provided with a plurality of openings in the side thereof, a longitudinally sliding locking bolt having its end conformed to engage in one of said apertures, said bolt having a transverse slot formed therein, a manually rotatable shaft, the axis of which is perpendicular to the axis of said bolt and laterally displaced from the axis thereof, and an eccentric projection on the end of said shaft, said projection being engageable in the slot in said bolt to shift the latter longitudinally into locking engagement with one of the apertures in said driven pulley upon rotation of said shaft.

7. In combination, a machine tool, an auxiliary tool supported upon said machine tool, a rotatable cutting tool receiving element in said auxiliary tool, a motor carried by said auxiliary tool for driving said rotatable element, said motor being movable with said auxiliary tool as the latter is set up for different machining operations, driving means for transmitting power from said motor to said auxiliary tool at any one of a plurality of speeds, and means for rotatably adjusting the position of said auxiliary tool with respect to said machine tool, said last named means including a rotatably adjustable clamp for securing the auxiliary tool to said machine tool and an adjustable pivotal connection between the auxiliary tool and the clamp, the latter having its axis eccentric of the axis of said clamp.

8. In a machine tool, a rotatable element, a motor for driving said rotatable element, a driving pulley secured to the rotating part of said motor, a driven pulley secured to said rotatable element, a belt cooperable with said pulleys for transmitting power from said motor to said rotatable element, each of said pulleys having a plurality of cooperating belt receiving grooves of different diameters providing means for driving said rotatable element at a plurality of different speeds, means for adjustably positioning one of said pulleys in a laterally displaced position with respect to the other of said pulleys such that a plurality of belt receiving grooves of one of the pulleys will be in alignment with different grooves respectively on the other of said pulleys, whereby an additional series of speeds for said element will be available.

HENNING A. EKLIND.